Patented May 27, 1952

2,597,938

UNITED STATES PATENT OFFICE 2,597,938

AMINOPHOSPHONO-HALO-ALKANALS AND PREPARATION THEREOF

Elbert C. Ladd and Merlin P. Harvey, Passaic, N. J., assignors to United States Rubber Company, New York, N. Y., a corporation of New Jersey No Drawing. Application March 30, 1951, Serial No. 218,519

3 Claims. (Cl. 260—551)

This invention relates to improvements in chemicals.

We have discovered that one mole of an alpha-halogenated aldehyde will react with one mole of an alkyl ester of a tetraalkyldiamidophosphorous acid, to yield the corresponding alpha-diamidophosphono aldehyde, with the elimination of an alkyl halide, thus:

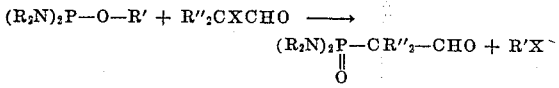

where R and R' are lower alkyl; R'' is H, lower alkyl, aralkyl, aryl or halogen; and X is halogen. In each instance the alkyl group has 1–5 carbon atoms.

In the practice of our invention, one mole of the halogenated aldehyde is admixed (portionwise, if desired) with one mole of the organophosphorus compound. The intensity of the reaction will vary somewhat with the specific reactants employed; and the reaction is frequently exothermic, making cooling desirable. In some cases the reaction may be further speeded by heating at moderate temperatures, for example, 50° C.–100° C. Reaction times are usually of brief duration, and those in excess of 15 hours are seldom if ever necessary. Reactions are usually complete in ½ to 5 hours. The product of reaction is conveniently isolated and purified by fractional distillation or by preferential extraction.

Illustrative of the amidophosphites which are usable in our invention are the following:

[(C4H9)2N]2POC2H5
C4H9OP[N(CH3)2]2
[(CH3)2N]2POC2H5
C4H9.O.P(NC5H10)2
[(CH3)2N]2P.O.C2H4Cl

Among the alpha-halogenated aldehydes employed we particularly prefer those containing at least two alpha chlorines. Examples of the aldehydes are chloral, 2,2-dichloroacetaldehyde, 2,2-dichloropropionaldehyde, 2,2-dichlorobutyraldehyde, 2,2,3-trichlorobutyraldehyde, alpha, alpha-dichloro-alpha-phenyl-acetaldehyde, bromal, dibromoacetaldehyde, alpha, beta-dichloro-beta-phenylpropionaldehyde, alpha-beta-dibromo-beta-phenylpropionaldehyde, chloroacetaldehyde.

By the method of our invention we may prepare, for example, such amidophosphonoaldehydes as:

Tetraethyldiamidophosphonodichloroacetaldehyde
Tetrapropyldiamidophosphonodichloroacetaldehyde
Tetraisopropyldiamidophosphonodichloroacetaldehyde
Tetra-n-butyldiamidophosphonodichloroacetaldehyde
Tetra-sec.-butyldiamidophosphonodichloroacetaldehyde
Tetramethyldiamidophosphonodichlorobutyraldehyde
Tetraethyldiamidophosphonodichlorobutyraldehyde The following example illustrates our invention:

Example

During a one hour period 19.2 grams (0.1 mole) of the butyl ester of tetramethyldiamidophosphorous acid is added dropwise to 14.7 grams (0.1 mole) of chloral, the latter being stirred continuously during the addition. The reaction is exothermic, and the mixture is cooled, whenever necessary, to maintain the temperature at 70° C. or lower. Vacuum distillation gives 6.7 grams of 1-chlorobutane and 15.4 grams (62% yield) of the compound tetramethyldiamidophosphonodichloroacetaldehyde,

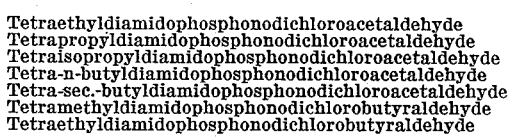

This new compound is a colorless liquid, B. 95–95.5° C./0.4 mm.; $n_D^{20}$=1.4780.

Analysis:
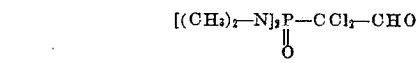
Found: Cl, 28.13%; P, 12.55%
Theory (C6H13Cl2N2O2P):
Cl, 28.71%; P, 12.54%

Similar compounds are obtained by varying the alkyl group attached to the N atoms. The choice of alkyl in the ester group is immaterial, since this alkyl is eliminated in the reaction.

The butyl tetramethyldiamidophosphite used in the above example is prepared as follows:

To a solution of 90 grams (2.0 moles) of dimethylamine in 500 ml. of absolute ether is added a solution of 58 grams (0.33 mole) of butoxydichlorophosphine in 200 ml. of absolute ether. The mixture is stirred continuously and maintained at a temperature between −10° C. and −20° C. Filtration of the reaction mixture and subsequent distillation of the filtrate gives 53 grams (83% yield) of butyl tetramethyldiamidophosphite, B. 46.5° C./35 mm., $n_D^{20}$=1.4492.

Analysis:

Found: N, 14.45%; P, 16.34%
Theory (for $C_8H_{21}N_2OP$):
N, 14.75%; P, 16.12%

Our new products are useful as solvents and plasticizers for polar thermoplastic resins, as, for example, polyvinyl chloride, butadiene-acrylonitrile copolymers, polyacrylonitrile. A mixture of 3 parts of polyvinyl chloride mixed with 2 parts of the chemical of the example on a rubber mill and then compression molded at 150° C. gave a rubbery, flexible plastic. Polyvinyl chloride containing no added chemical is hard and rigid.

Having thus described our invention, what we claim and desire to protect by Letters Patent is:

1. Tetraalkyldiamidophosphonohaloalkanals, wherein each alkyl group has from 1 to 5 carbon atoms.
2. Tetramethyldiamidophosphonodichloroacetaldehyde.
3. A process of producing tetraalkyldiamidophosphonohaloalkanals wherein each alkyl group has from 1 to 5 carbon atoms, which comprises reacting an alphahalogenated alkanal, mole for mole with an alkyl ester of a tetraalkyldiamidophosphorous acid, with elimination of alkyl halide, wherein each alkyl group has from 1 to 5 carbon atoms.

ELBERT C. LADD.
MERLIN P. HARVEY.

No references cited.